United States Patent
Wandrie, III (10) Patent No.: US 9,816,459 B2
(45) Date of Patent: Nov. 14, 2017

(54) PISTON WITH MULTI-ARCUATE CROSS-SECTION AND LUBRICANT EXHAUST APERTURE

(71) Applicant: Industrial Parts Depot, LLC, Torrance, CA (US)

(72) Inventor: Henry Maurice Wandrie, III, Torrance, CA (US)

(73) Assignee: Industrial Parts Depot, LLC, Torrance, CA (US)

( * ) Notice: Subject to any disclaimer, the term of this patent is extended or adjusted under 35 U.S.C. 154(b) by 27 days.

(21) Appl. No.: 14/689,520

(22) Filed: Apr. 17, 2015

(65) Prior Publication Data

US 2016/0305362 A1 Oct. 20, 2016

(51) Int. Cl.
*F02F 3/00* (2006.01)
*B23P 15/10* (2006.01)
*F02F 3/22* (2006.01)

(52) U.S. Cl.
CPC .............. *F02F 3/003* (2013.01); *B23P 15/10* (2013.01); *F02F 3/22* (2013.01); *F02F 2003/0061* (2013.01)

(58) Field of Classification Search
CPC .. F02F 3/003; F02F 2003/0061; F02F 3/0015; F02F 3/00; F02F 3/0084; F02F 2200/00; F02F 2200/06; F02F 3/16; B23P 15/10; B23P 15/08; B23P 6/04; B23P 15/06
USPC ......... 123/193.1, 193.6; 29/888.04, 888.042, 29/888.047
See application file for complete search history.

(56) References Cited

U.S. PATENT DOCUMENTS

| | | | | |
|---|---|---|---|---|
| 2,577,022 A | * | 12/1951 | Lieberherr | F02F 3/0023 277/451 |
| 4,669,369 A | * | 6/1987 | Holt | F02F 7/0085 123/193.6 |
| 5,040,454 A | | 8/1991 | Ballheimer et al. | |
| 5,144,923 A | * | 9/1992 | Leites | B23P 15/10 123/193.6 |
| 6,155,157 A | | 12/2000 | Jarrett | |
| 6,491,013 B1 | * | 12/2002 | Gaiser | F02F 3/22 123/193.6 |
| 6,651,549 B2 | * | 11/2003 | Zhu | F02F 3/003 92/186 |
| 6,862,976 B2 | | 3/2005 | Gaiser et al. | |

(Continued)

OTHER PUBLICATIONS

BPAI Decision Regarding U.S. Pat. No. 6,862,976.
"Basic Features of Good Piston Design" Automotive Industries, (May 1, 1954), pp. 54-56, 106.

*Primary Examiner* — Long T Tran
(74) *Attorney, Agent, or Firm* — Wegman, Hessler & Vanderburg (57) ABSTRACT

A piston and methods for constructing a piston for use in an internal combustion engine are presented wherein the piston includes a cylindrical body extending from the crown. The cylindrical body defines a ring groove, and a portion of the cylindrical body defines a non-circular cross-section below the ring groove. The ring groove is configured to correspond with an associated sealing ring. The non-circular cross-section creates a gap between the cylindrical body and an associated cylinder wall enabling a quantity of oil to pass from an annular region between the cylindrical body and the associated cylinder wall.

10 Claims, 10 Drawing Sheets

(56) References Cited

U.S. PATENT DOCUMENTS

| | | | | |
|---|---|---|---|---|
| 7,938,093 | B2* | 5/2011 | Rasmussen | F02F 3/0069 123/193.6 |
| 8,042,453 | B2 | 10/2011 | Azevedo | |
| 8,943,687 | B2* | 2/2015 | Scharp | B21K 1/185 123/193.6 |
| 2003/0051694 | A1* | 3/2003 | Gaiser | F02F 3/003 123/193.6 |
| 2003/0075042 | A1 | 4/2003 | Gaiser et al. | |
| 2005/0005892 | A1* | 1/2005 | Nishimura | C10M 145/08 123/193.4 |
| 2006/0150941 | A1* | 7/2006 | Verbrugge | F02B 77/04 123/193.6 |
| 2011/0073061 | A1* | 3/2011 | Chae | F02F 3/0076 123/193.6 |
| 2012/0037112 | A1* | 2/2012 | Muscas | F02F 3/003 123/193.6 |
| 2012/0048229 | A1* | 3/2012 | Rasmussen | F02F 3/0084 123/197.2 |
| 2012/0260882 | A1* | 10/2012 | Martins | B23B 1/00 123/193.6 |
| 2013/0276740 | A1* | 10/2013 | Wandrie, III | F02F 3/22 123/193.6 |
| 2014/0311437 | A1* | 10/2014 | Lopez | F16J 9/206 123/193.1 |
| 2014/0352650 | A1* | 12/2014 | Muscas | F02F 3/003 123/193.6 |

* cited by examiner

PISTON WITH MULTI-ARCUATE CROSS-SECTION AND LUBRICANT EXHAUST APERTURE

BACKGROUND

1. Field of the Disclosure

The present disclosure is directed to a piston for use in diesel and other internal combustion engines, and more particularly, a piston comprising two pieces precision cast of steel or similar materials and friction-welded into a complete piston.

2. Description of Related Art

Present diesel and other high performance internal combustion engines are being operated at extremely high combustion pressures and temperatures. For example, many on- and off-road diesel applications operate with diesel fuel injection at pressures in excess of 30,000 psi and exhaust gas turbo-charging which can create intake manifold pressures in excess of 50 psi. In addition, government mandated exhaust emission standards in developed countries and markets including, but not limited to, the United States, Japan, and the EEC require strict control of the combustion processes and strict control of emissions in service, as well as specific performance and emissions control longevity of the engines during on-road, off-road, and marine applications.

The foregoing conditions have resulted in multiple strategies employed to cool the pistons of such engines, the most common of which is to precisely inject substantial amounts of engine oil into chambers formed in the pistons to remove combustion heat.

Presently known piston designs, which are commercially practiced, do not adequately address several extremely critical aspects of piston manufacturing and performance including but not limited to the foregoing. For example, current piston designs struggle to obtain proper dimensional attributes to generally maintain required operational and long-term durable performance of the piston to cylinder bore sealing rings at presently required operating temperatures and pressures as well as minimizing combustion gas blow-by and resultant increased exhaust emissions without costly and extensive machining operations and other additional manufacturing steps. Additionally, current piston designs have problems incorporating an integral reservoir for cooling oil into the piston crown area with adequate volume and highly consistent piston-to-piston volume without the incorporation of separate sealing dams or rings that are mechanically attached to the piston in various manners, all of which require additional machining and manufacturing steps to prepare the piston to accept the separate sealing dams or rings, the inserting and fixing of the sealing rings in the manufacturing process, and the separate manufacture of the sealing dams or rings themselves. Further, current piston designs also have problems with the mechanical failure of the cooling oil reservoir dams or rings and/or the failure of the fixing means of such devices to the piston, causing physical separation from the piston and the resulting loss of cooling oil in one or more pistons and introduction of foreign materials into the interior of the engine and subsequent severe engine damage or failure.

The absence of adequate mechanical support of the piston to cylinder bore sealing ring area of typical pistons including, but not limited to, the flexure of the lower parts of the sealing ring areas and the area where the ring sealing area joins the piston crown often results in cracking and failure of such areas of the piston that incorporate the sealing rings and result in severe engine damage or failure. Also, the absence of adequate mechanical support of the sealing ring area of typical pistons results in the reduction and/or loss of sealing ring performance that causes gas blow-by, which leads to lubricating oil infiltration into the combustion chamber and coating the ring lands with partially combusted lube oil in a process termed "coking." Each of these conditions increases exhaust emissions and/or causes mechanical failure of the sealing rings and severe engine damage or failure.

It is also known in the art to friction weld two or more previously machined parts of a piston together to permit various configurations to be made that would otherwise be commercially impractical or impossible. Typical two-piece pistons consist of a steel forged crown and a separate skirt, usually forged of the same or a compatible steel alloy which guides the piston assembly in the combustion cylinder of an engine. Prior to friction welding the mating surfaces of the crown and skirt, the crown requires extensive and costly machining operations to provide opposing, axially-aligned bores that are configured to accept a steel pin which joins the piston with a connecting rod. This known piston design is configured to provide a heat and pressure resistant steel crown incorporating the sealing rings and an attached lower member comprised of the skirt. The separate pieces presently start out in as-forged or as/rough-cast condition and are subsequently machined to close tolerances prior to joining by way of friction or inertia welding or another suitable method. However, in each of these processes for producing a piston, precision machining the joining or connecting surfaces that are to be welded together is a costly and additional required prior step/operation to prepare the two piston pieces for the friction welding process.

Known two-piece friction welded pistons also incorporate a cooling oil reservoir which can consist of a recess in the piston crown and/or separate reservoirs in the skirt. Alternatively, a reservoir is formed in the crown and is closed off with a plate assembly, wherein the composite reservoirs communicate with oil spray jets located in the engine block to introduce cooling oil to the underside of the piston crown to reduce the operating temperature of the crown and thus prolong piston life and ensure proper operation of the piston to cylinder bore sealing rings.

Such pistons as described above tend to be very heavy and their configurations are limited by the possible need to join three separate parts to form a complete piston: (1) the steel crown and sealing ring groove section, (2) the skirt section by friction welding and (3) the machining of a receptacle for and the mechanical insertion of an oil dam or plate. Similarly, such piston designs often require multiple methods of forming a cooling oil reservoir/gallery including machining and the mechanical insertion of dams or plates to form such reservoirs.

The incorporation of cooling oil reservoirs or galleries in a piston is also commonly known. This is typically done with the employment of separate dams or plates of various materials which are inserted and fixed beneath the crown area. Alternatively, such reservoirs may also be partially incorporated in one or more of the two-piece friction welded pistons by machining such reservoirs in rough castings or rough forgings prior to joining them in a friction welding process.

Other known piston designs are made of rough cast or as-rough forged as one-piece configurations. However, these designs have several disadvantages including the requirement of extensive post-forging or post-casting machining, the absence of a closed oil gallery formed integrally with the crown, and the absence of lateral/axial support of the lower portion of the sealing ring carrying portion of the piston crown. These design and manufacturing limitations result in requiring a separate oil dam inserted in the crown and the absence of axial and radial support to prevent flexure of the sealing ring portion of the piston. This lack of axial and radial support is known to cause premature flexure failures of the piston crown and the degradation of the piston to cylinder bore sealing ring performance during the service life of the piston which can increase the exhaust emissions of an engine so equipped and can result severe engine damage or failure thereof. The flexure of the lower part of the piston which contains the piston to cylinder bore sealing ring grooves leads to the loss of long-term complete sealing between the piston and the cylinder bore seating rings which, in turn, results in higher oil consumption, combustion blow-by, higher operating temperatures, coking, reduction in service life and increased exhaust emissions which can render the operation of the engine unlawful under certain rules and regulations.

In presently employed friction welded pistons comprising a closed oil gallery, three sealing rings are employed; the first and most adjacent to the piston crown is a one piece compression ring which seals the piston to the cylinder bore during the four cycles of operation. The second and next adjacent ring is also a one piece compression ring which complements the first ring and completes the seal of the piston to the cylinder bore in a similar manner. The third ring is an oil scraper ring which comprises one or more parts which function solely to remove the cooling and lubricating oil from between the piston the cylinder wall during each of the piston strokes In each of the foregoing configurations of pistons, it is critical to provide a means by which lubricating and cooling oil removed by the third ring during the movements of the piston can be immediately returned to the engine crankcase by way of the cylinder bore and through certain interruptions in the cylindrical piston body as described below Accordingly, there is a need for a piston that facilitates the passage of the foregoing oil to the cylinder bore and thence the engine crankcase after it is wiped and/or scraped from the cylinder wall. There is also a need for a piston that eliminates additional post-casting and/or post-forging machining including but not limited to that which incorporates and/or affixes separate oil reservoir sealing dams. There is also a need for eliminating post-casting and/or post-forging machining of contact or joining surfaces prior to an inertia or friction welding process for joining at least two separate pieces of a piston.

SUMMARY

According to one aspect, the subject application involves a piston for use in an internal combustion engine. The piston includes a circular crown located at an upper portion of the piston. The piston also includes a combustion surface extending radially inward from the outer circumference of the crown. The piston further includes a cylindrical body depending at right angles from the upper surface of the crown. The cylindrical body defines at least one circumferential compression ring groove and at least one oil control ring groove. A portion of the cylindrical body defines at least one multi-arcuate horizontal cross-section below the oil control ring groove, and the multi-arcuate horizontal cross-section includes arcs including different radii. The piston still further includes a pair of opposing surfaces, each surface defining a bore formed therethrough. The oil control ring groove is configured to correspond with an associated oil control ring and beneath which the multi-arcuate horizontal cross-section creates a gap between the cylindrical body and an associated cylinder wall. This enables a quantity of oil to pass from an annular region beneath the oil control ring groove between the cylindrical body and the associated cylinder wall to an area adjacent one of the pair of opposing surfaces. The piston also includes an upper member. The upper member is precision cast to net final dimensions, and the upper member includes the crown and the combustion surface. The upper member further including a first upper connecting surface and a second upper connecting surface. The first and second upper connecting surfaces are concentrically disposed. The piston further includes a lower member. The lower member is precision cast to net final dimensions. The lower member includes the pair of opposing surfaces, and the lower member further includes a first lower connecting surface and a second lower connecting surface. The first and second lower connecting surfaces are concentrically disposed. The lower member is integrally connected to the upper member by friction welding such that the first upper connecting surface and the first lower connecting surface form a first welded joint therebetween. The second upper connecting surface and the second lower connecting surface form a second welded joint therebetween.

According to another aspect, the subject application involves a piston for use in an internal combustion engine. The piston includes a cylindrical body that defines at least one oil control ring groove. A portion of the cylindrical body defines a multi-arcuate horizontal cross-section below the oil control ring groove. The piston also includes an upper member. The upper member being precision cast to net final dimensions. The upper member having a combustion surface and at least two concentrically disposed upper connecting surfaces spaced apart from the combustion surface. The piston further includes a lower member. The lower member being precision cast to net final dimensions. The lower member having a pair of bores formed therethrough for receiving a connecting rod pin, and the lower member having at least two concentrically disposed lower connecting surfaces. The lower member is attached to the upper member by way of friction welding such that each upper connecting surface of the upper member forms a welded joint with one of the lower connecting surfaces. The multi-arcuate horizontal cross section beneath the oil control ring groove creates a gap between the cylindrical body and an associated cylinder wall enabling a quantity of oil to pass from an annular region between the cylindrical body and the associated cylinder wall to an area adjacent one of the opposing surfaces.

According to yet another aspect, the subject application involves a method of manufacturing a piston. The method includes the step of precision casting to net final dimensions an upper member. The upper member includes a combustion surface and at least two upper connecting surfaces concentrically disposed and spaced apart from the combustion surface. The method also includes the step of precision casting to net final dimensions a lower member. The lower member includes a pair of opposing surfaces having a bore formed through each of the surfaces. The lower member also including at least two lower connecting surfaces concentrically disposed. The lower member also defines a multi-arcuate horizontal cross-section that creates a gap between the piston and an associated cylinder wall enabling a quantity of oil to pass from an annular region between the piston and the associated cylinder wall to an area adjacent one of the pair of opposing surfaces. The method further includes the step of friction welding the lower member to the upper member. A welded joint is formed between each of the upper connecting surfaces of the upper member and a corresponding lower connecting surface of the lower member.

Advantages of the present disclosure will become more apparent to those skilled in the art from the following description of the embodiments of the disclosure which have been shown and described by way of illustration. As will be realized, the described apparatus and method are capable of other and different embodiments, and their details are capable of modification in various respects.

BRIEF DESCRIPTION OF THE DRAWINGS

These and other features of the present disclosure, and their advantages, are illustrated specifically in embodiments of the disclosure now to be described, by way of example, with reference to the accompanying diagrammatic drawings, in which.

It should be noted that all the drawings are diagrammatic and not drawn to scale. Relative dimensions and proportions of parts of these figures may have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure.

For example, the terms "higher," "up," "lower," "down," and "below" refer to directions relative to the central axis of a piston. The terms higher and up are intended to indicate a position on the piston closer to a crown of the piston. The terms lower, down, and below are intended to indicate a position closer to the opposite end of the piston from the crown. Additionally, the term "vertical cross section" indicates a cross section of the piston along a plane that is parallel or co-planar with the central axis of the piston. "Horizontal cross section" indicates a cross section of the piston along a plane that is transverse to the central axis of the piston. Still further, in the drawings, the same reference numerals are employed for designating the same elements.

Figure 1:
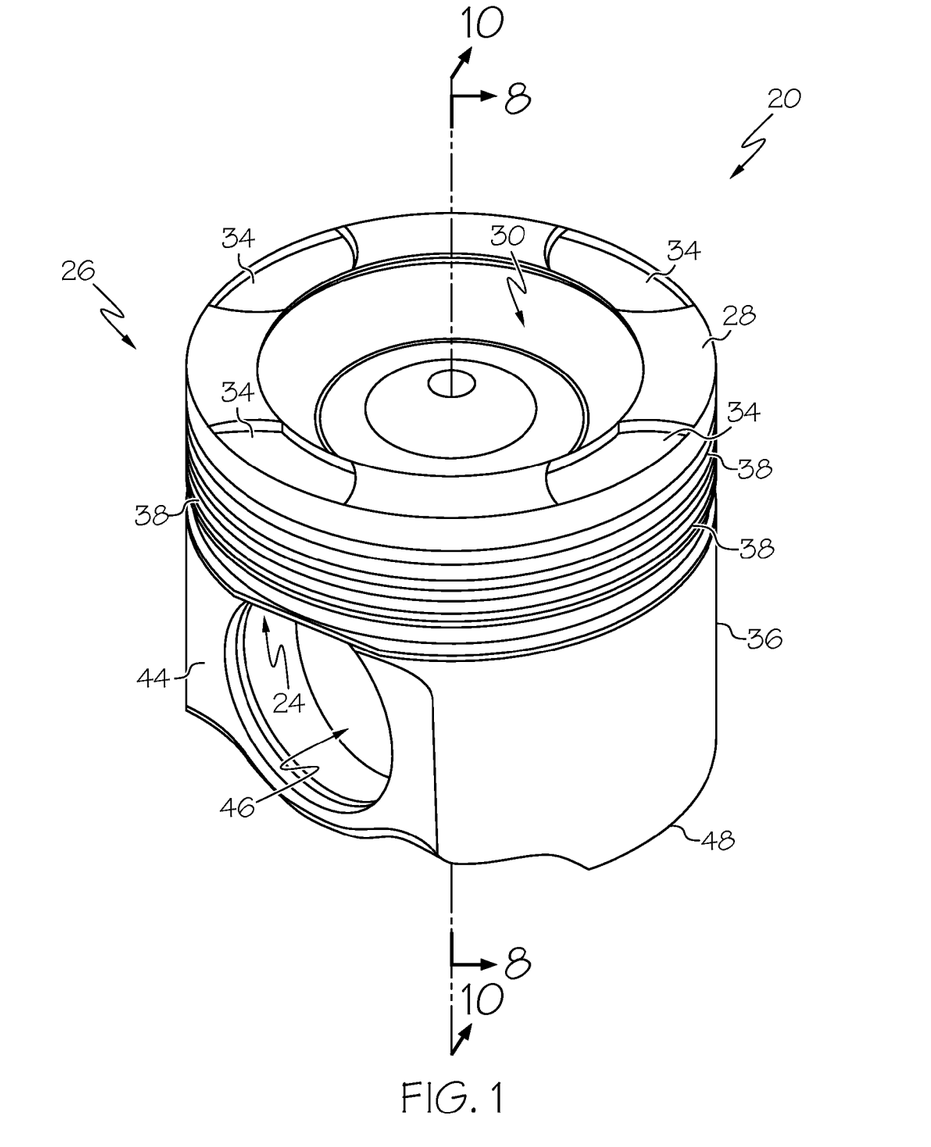
FIG. 1 is a top perspective of an embodiment of a friction-welded piston of the present disclosure.
Figure 2:
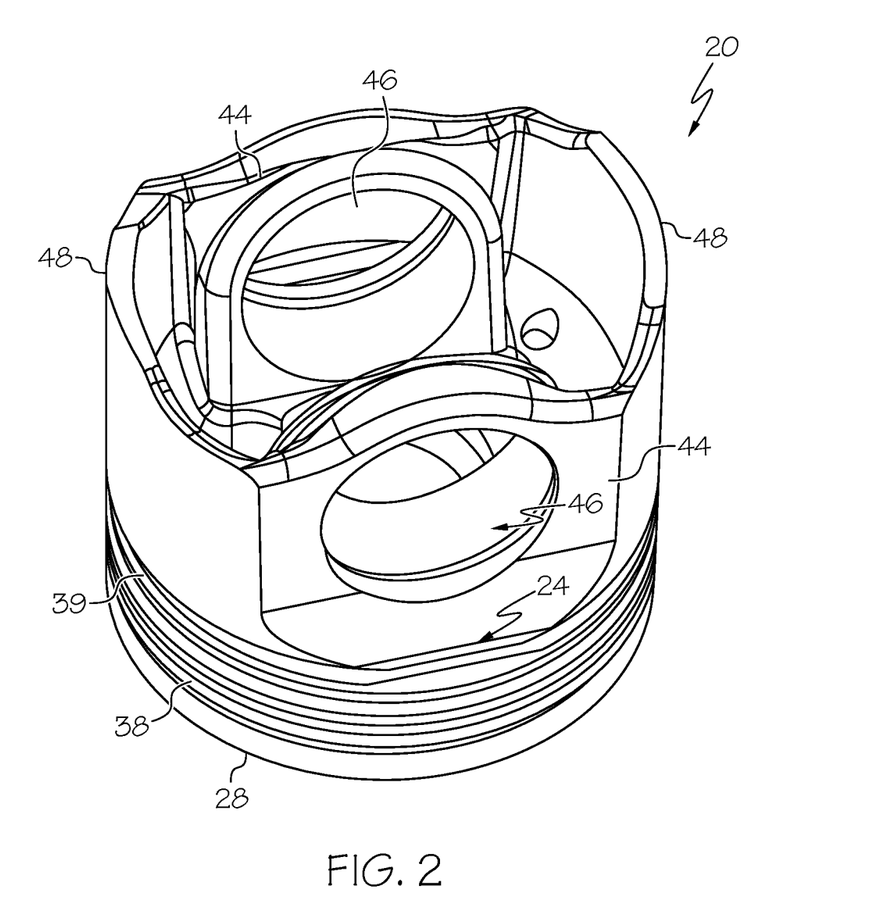
FIG. 2 is a bottom perspective of the piston shown in FIG. 1.

Turning to FIG. 1, an embodiment of a piston 20 is shown, wherein a portion of the piston 20 includes a multi-arcuate cross-section 24 which will be described in greater detail below. The piston 20 is a generally cylindrical member wherein an upper portion 26 of the piston 20 forms the lower boundary of a combustion chamber formed within each combustion cylinder of an internal combustion engine (not shown). The upper portion 26 includes a substantially flat crown 28 having a central recess 30, or combustion surface, extending radially inward from the crown 28. In one example, the upper portion 26 includes at least one recess 34 formed into the crown 28 to prevent contact between the crown 28 and the combustion air intake and exhaust valves (not shown) during operation. In the illustrated embodiment shown in FIG. 1, the crown 28 includes four (4) recesses 34 formed therein, but it should be understood by one of ordinary skill in the art that any number of recesses 34 can be formed into the crown 28 to prevent contact between the crown 28 and any selected number of exhaust or air intake valves.

Figure 7:
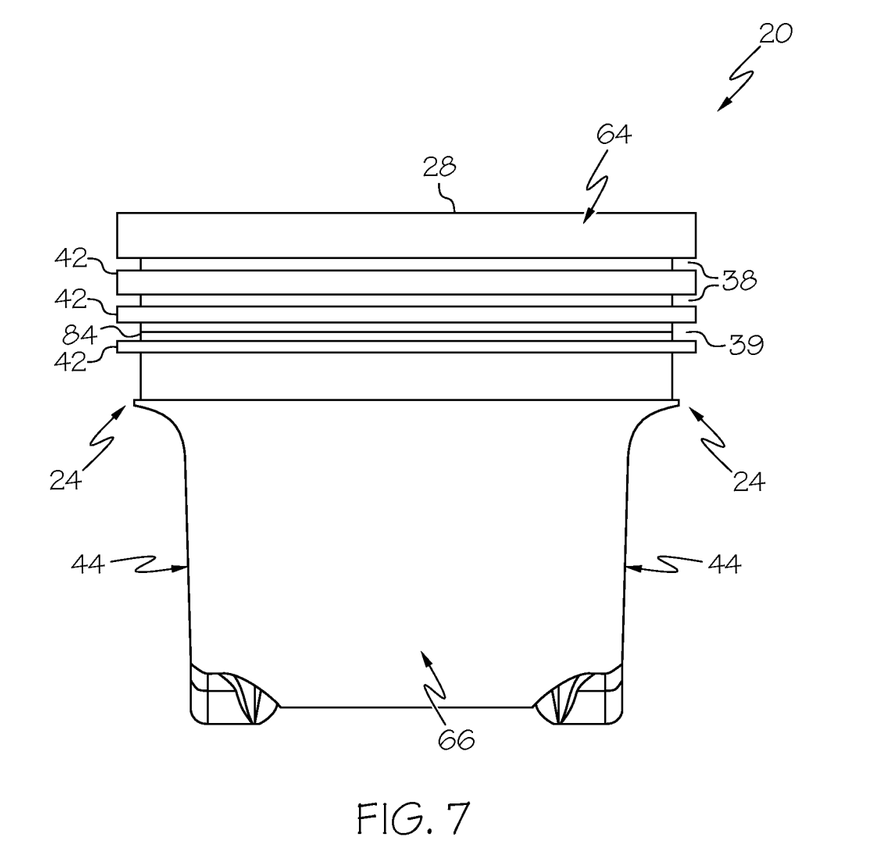
FIG. 7 is a side view of the piston shown in FIG. 1, oriented at 90° relative to the view shown in FIG. 6.
Figure 8:
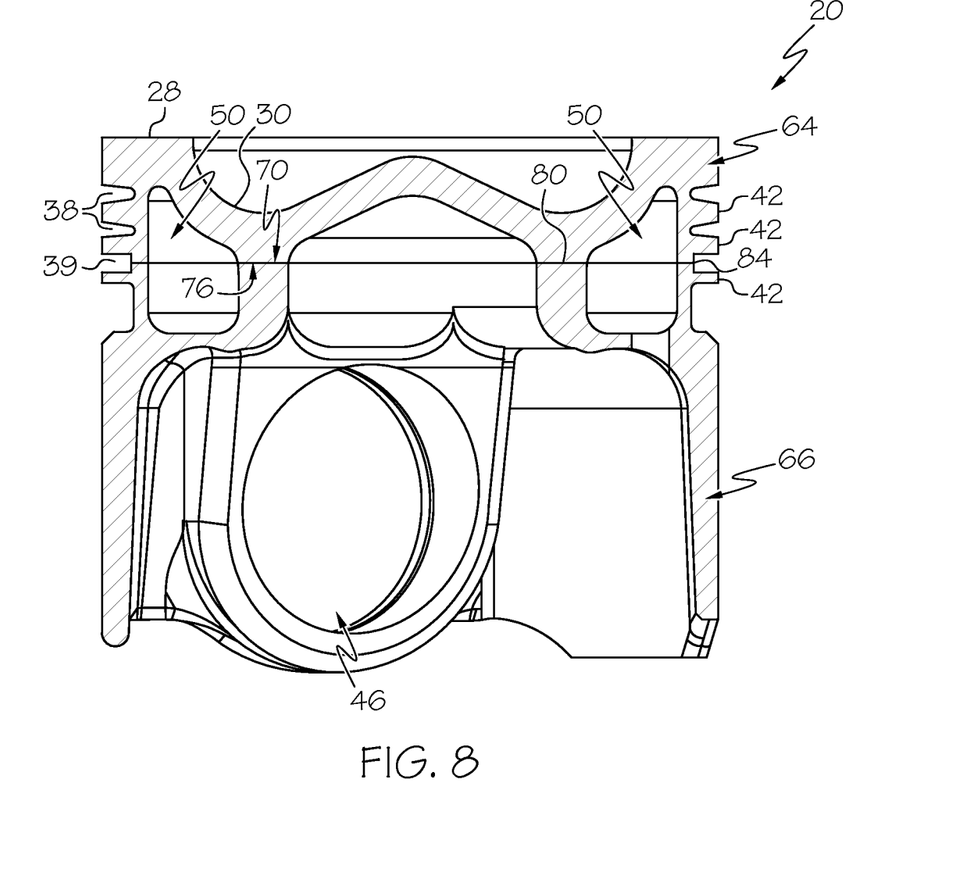
FIG. 8 is an oblique vertical cross-sectional view of the completed piston as shown in FIG. 1, taken along the line 8-8 in FIG. 1.
Figure 9:
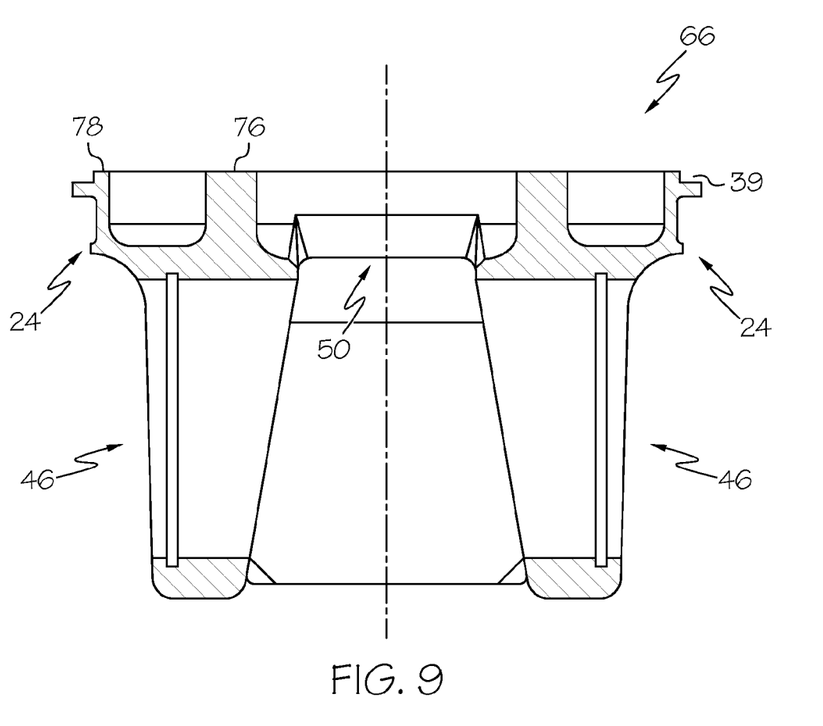
FIG. 9 is a vertical cross-sectional view of the bottom piece of a two-piece friction-welded piston.

The piston 20 further includes a cylindrical body 36 depending from the crown 28. The cylindrical body 36 defines at least one groove formed about the outer circumferential surface of the cylindrical body 36. In the illustrated embodiment, the piston 20 includes two (2) compression ring grooves 38 and one oil control ring groove 39 formed into the outer circumferential surface (best seen in FIGS. 7-9). The compression ring grooves 38 are configured for use with piston sealing rings (not shown), and the oil control ring groove is configured for use with an oil control ring 41 (best seen in FIG. 10). However, it should be understood by one of ordinary skill in the art that other numbers of compression ring grooves 38 and oil control ring grooves 39 in various arrangements can be formed into the outer circumferential surface of the piston 20. Each of the ridges 42 between the grooves 38, 39 can be termed a "ring land" or a "piston land."

In the shown example, the top two compression ring grooves 38 cooperate with the piston sealing rings to form a seal between the combustion chamber and the crankcase of the engine. The goal is to prevent combustion gases from passing into the crankcase and prevent oil from passing into the combustion chamber. During the compression and power strokes, at least one of the piston sealing rings seals the combustion gases and reduces and/or prevents blow-by.

Figure 10:
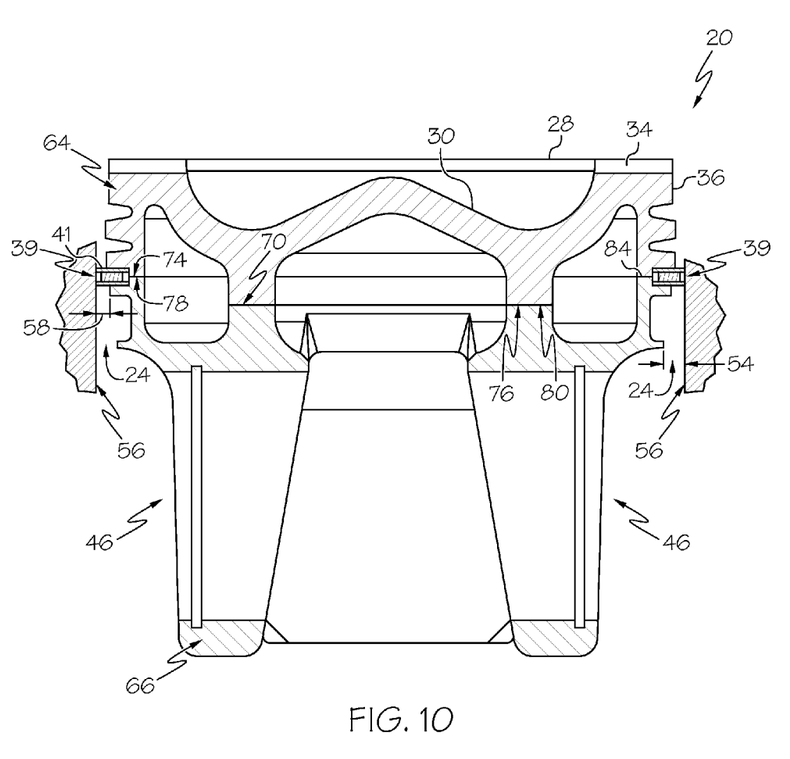
FIG. 10 is a vertical cross-sectional view of the piston shown in FIG. 1, taken along the line 10-10 in FIG. 1.

Additionally, the oil control ring groove 39 cooperates with the oil control ring 41 to control the oil that is introduced onto the cylinder walls by lubricating oil circulating in the engine and cooling oil injected into the piston crown and subsequently exiting into the engine crankcase. The oil control ring 41 scrapes the cylinder walls to return the scraped oil back toward the crankcase. One goal of the oil control ring 41 is to reduce and/or prevent oil passage between the face of the oil control ring 41 and the cylinder through the ring gap or pass behind the oil control ring 41.

While not shown, the oil control ring 41 can include any number of structures, including multiple-piece rings used with an expander/spacer.

In one example, the piston 20 includes a truncated outer surface that forms a pair of opposing surfaces 44. The surfaces 44 are formed as substantially flat portions of the outer circumferential surface of the piston 20, and the surfaces 44 are substantially aligned in a parallel manner and can be equidistant from the central axis. Each surface 44 defines a bore 46 formed through the surface 44. The bore 46 includes an axis that is perpendicular to the central axis of the piston 20. The bore 46 is configured to cooperate with a connecting rod pin (not shown) for allowing the piston 20 to be operatively connected to a connecting rod (not shown) that translates the piston 20 within the combustion cylinder of an engine. The portions 48 of the piston 20 cylindrically extending between each of the opposing surfaces 44 form the outer boundary of an integral cooling reservoir 50 (best seen in FIG. 8).

Figure 11:
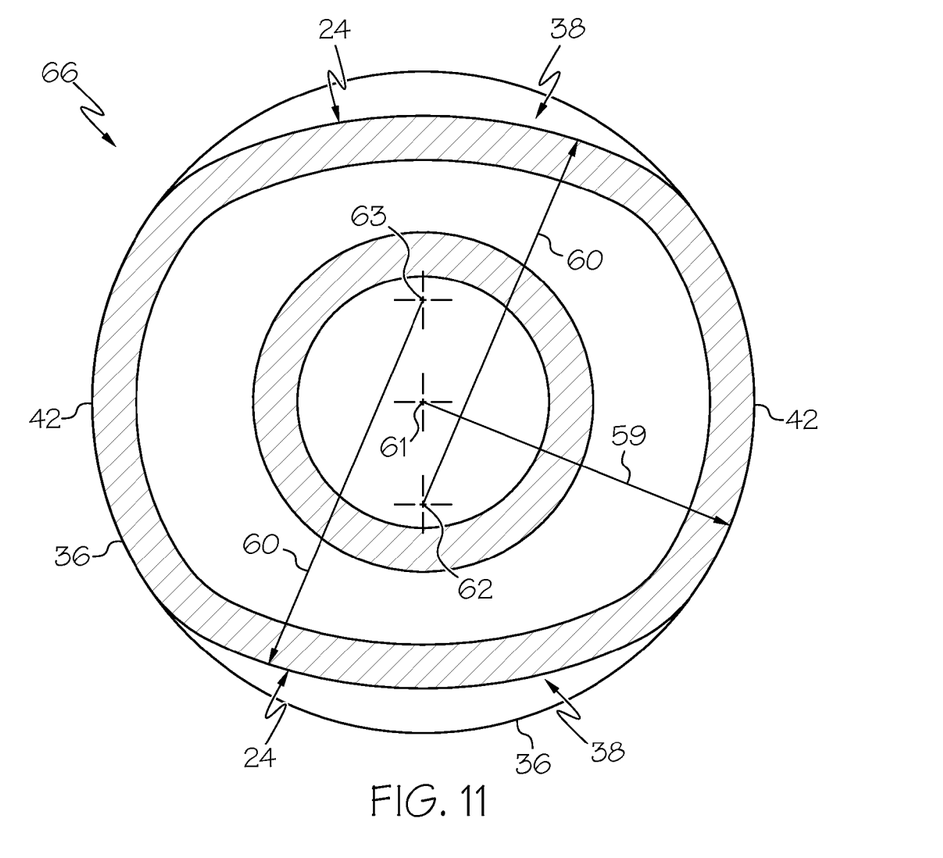
FIG. 11 is a horizontal cross-sectional view of the piston shown in FIG. 6, taken along the line 11-11 in FIG. 6.

As shown in FIGS. 10 and 11, a portion of the cylindrical body 36 defines one or more multi-arcuate, horizontal cross-section 24 below the oil control ring groove 39. As described above, one purpose of an oil control ring 41 is to "wipe" or remove a quantity of excess oil from an associated internal cylinder wall 56 as the piston 20 moves through a downward stroke. The oil is then returned to the other portions of the engine, which may include a crankcase and/or oil sump. The multi-arcuate, horizontal cross-section 24 creates a passage 54 between the cylindrical body 36 and the associated cylinder wall 56 of an engine, thereby enabling a quantity of oil to more easily pass from an annular region 58 between the cylindrical body 36 and the associated cylinder wall 56 to an area adjacent one of the pair of opposing surfaces 44. This enables the oil control ring 41 to more efficiently accomplish its task and move and/or remove a greater quantity of oil from the cylinder wall 56 and the annular region 58.

In one example, as shown in FIG. 11, the multi-arcuate horizontal cross-section 24 includes a radius 59 of the cylindrical portions 48 that is less than the radius 60 corresponding to the passage 54 portion of the multi-arcuate horizontal cross-section 24. In this way, the multi-arcuate horizontal cross-section 24 is defined by four arcs of constant radius, where one pair of arcs have equal radii that are different from the equal radii of the other pair of arcs. By definition, the two pairs of circular arcs have different center points 61, 62, 63. As shown, the radius 60 defines the multi-arcuate cross-section at the top and bottom of FIG. 11, while radius 59 defines the multi-arcuate cross-section to the right and left. Radius 60 is greater than radius 59, and the resulting arcs have different center points 61, 62, 63.

In another example, the multi-arcuate, horizontal cross-section is generally ovoid in shape. In other words, the perimeter of the multi-arcuate, horizontal cross-section 24 can be a figure constructed from two pairs of arcs, with two different radii. The arcs are joined at a point, in which lines tangential to both joining arcs lie on the same line, thus making the joint smooth. Any point on the ovoid perimeter belongs to an arc with a constant radius (shorter or longer). In another example, multi-arcuate, horizontal cross-section 24 can be defined by a series of intersecting arcs. In yet another example, the multi-arcuate horizontal cross section 24 can include elliptical portions, hyperbolic portions, parabolic portions, or even some straight lines. It is to be understood that other cross-section shapes and/or other similar shapes are also contemplated, so long as the horizontal cross-sectional shape creates the described passage 54 between the cylindrical body 36 and the associated cylinder wall 56 of the engine as shown in FIG. 10.

Figure 3:
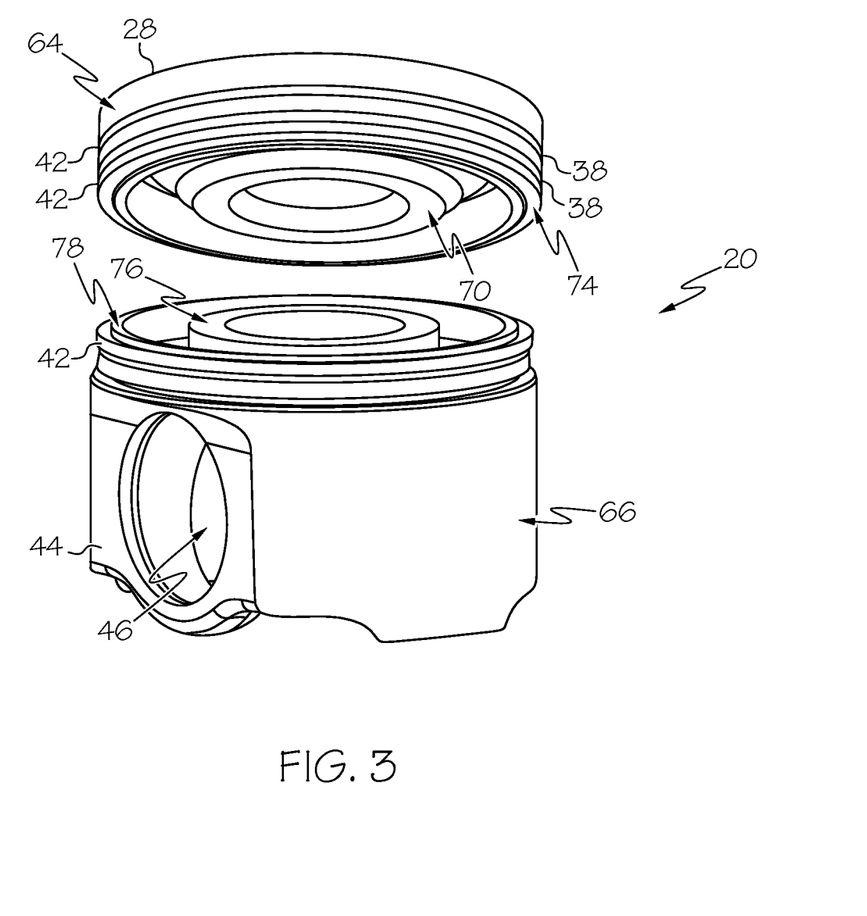
FIG. 3 is an oblique perspective view of an embodiment of upper and lower pieces of a two-piece friction-welded piston prior to joining by friction welding.
Figure 4:
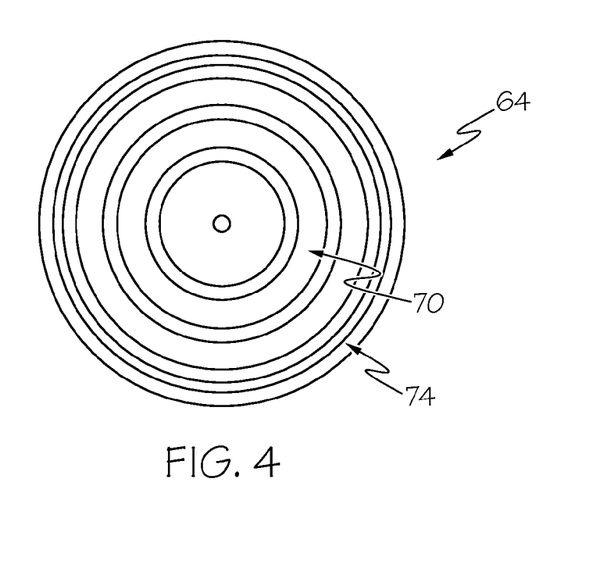
FIG. 4 is a bottom view of an embodiment of the upper piece of a two-piece friction-welded piston.
Figure 5:
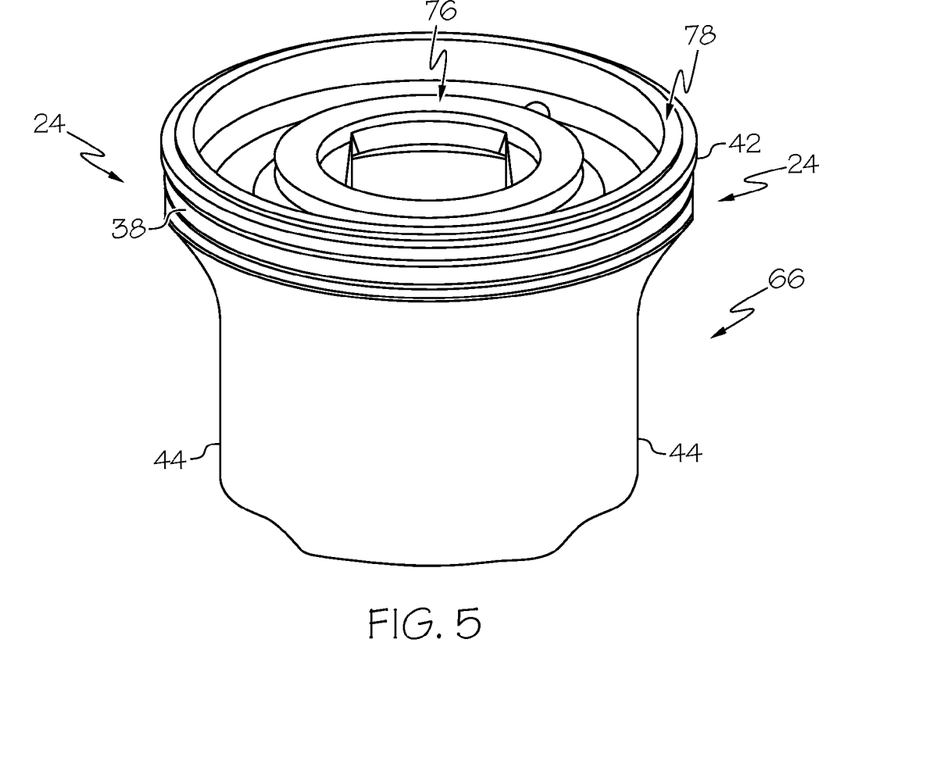
FIG. 5 is an oblique perspective view of the lower piece of the piston shown in FIG. 1.
Figure 6:
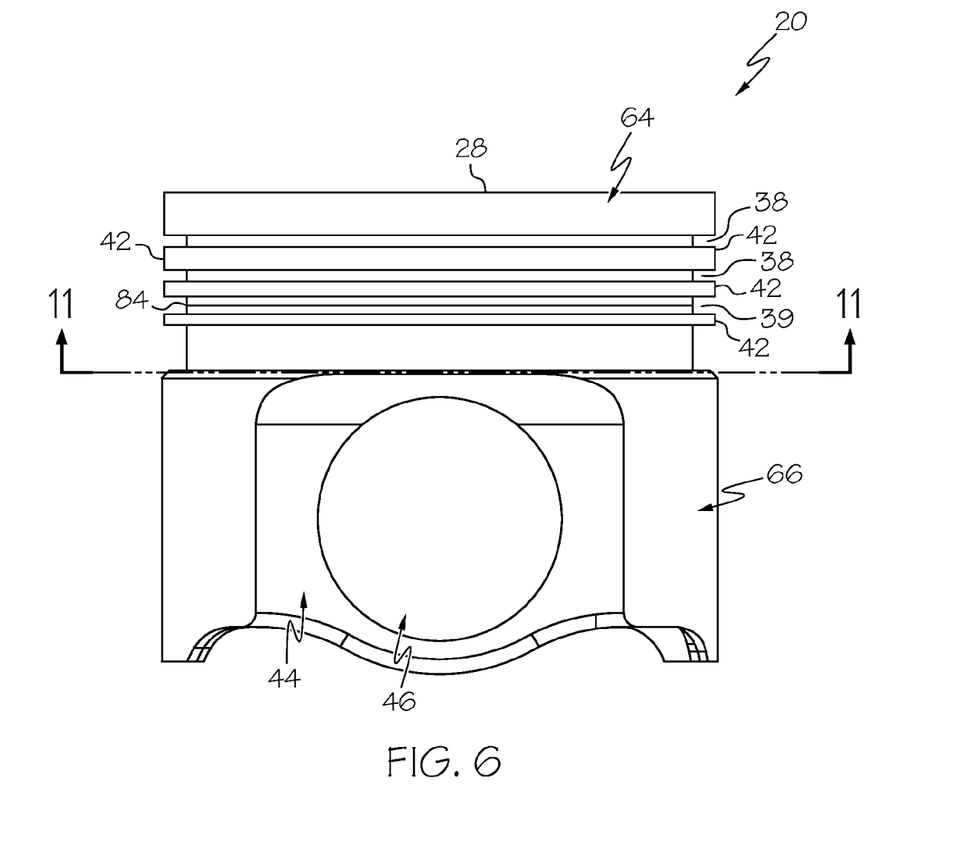
FIG. 6 is a side view of the piston shown in FIG. 1 oriented at 90° relative to the view shown in FIG. 5.

As shown in FIGS. 3-5, the piston 20 can include two distinct sections, such as an upper member 64 and a lower member 66 which are formed separately and joined together to form a single piston 20. The upper member 64 of the piston 20 is a generally cylindrical member that forms the upper portion of the piston 20 including the previously described crown 28 and the central recess 30. In the illustrated embodiment, the upper member 64 includes two (2) compression ring grooves 38 (also known as oil ring grooves) and a portion of one oil control ring groove 39 formed into the outer circumferential surface thereof. However, it should be understood by one of ordinary skill in the art that any number of compression ring grooves 38 and/or oil control ring grooves can be formed into the outer circumferential surface of the upper member 64 at any appropriate location on the central axis of the piston 20 above the bore 46.

As shown in FIGS. 3-4, the upper member 64 includes a first upper connecting surface 70 and a second upper connecting surface 74 formed on the downwardly-directed portion thereof. The first and second upper connecting surfaces 70, 74 are substantially concentrically disposed, wherein the first upper connecting surface 70 is positioned radially inward relative to the second upper connecting surface 74 of the piston 20. Although the illustrated embodiment of the piston 20 will be explained below as having two connecting surfaces on the upper member that mate with and correspond to two connecting surfaces on the lower member by which the upper and lower members 64, 66 are joined together via friction welding, it should be understood by one of ordinary skill in the art that the upper and lower members 64, 66 can be configured to include any number of corresponding connecting surfaces for connecting the upper member 64 to the lower member 66. In an embodiment, the first and second upper connecting surfaces 70, 74 are oriented substantially parallel and are coplanar. In another embodiment, at least one of the first or second upper connecting surfaces 70, 74 are parallel with respect to the crown 28 of the upper member 64 but are non-coplanar; and either of which may be located in a single or multiple planes with respect to one another such that each of which correspond with the concentrically disposed surfaces located in the opposite member.

As shown in FIGS. 1-3 and 5, the lower member 66 extends downwardly from the upper member 64 and includes a generally cylindrical shape along with the previously described pair of opposing surfaces 44. Each surface 44 includes a bore 46 formed therethrough, and the surface bores 46 are configured to receive a connecting rod pin (not shown) for operatively connecting the connecting rod to the piston 20. The portions of the lower member 66 cylindrically extending between each of the opposing surfaces 44 form the outer boundary of the integral cooling reservoir 50.

The lower member 66 can include one or more compression ring grooves 38 formed into the circumferential outer surface thereof, as shown in FIGS. 1-3 and 5. In the illustrated exemplary embodiment, the lower member 66 includes a portion of one oil control ring groove 39 formed therein. In an embodiment, the lower member 66 includes a first lower connecting surface 76 and a second lower connecting surface 78 formed on the upwardly-directed portion thereof, as shown in FIGS. 3 and 5. The first and second lower connecting surfaces 76, 78 are substantially concentrically disposed, wherein the first lower connecting surface 76 is positioned radially inward relative to the second lower connecting surface 78 of the lower member 66. In an embodiment, the first and second lower connecting surfaces 76, 78 are oriented substantially parallel relative to each other as well as vertically aligned (co-planar) relative to the axial centerline of the piston 20. In another example, at least one of the first lower connecting surface 76 is higher than the second lower connecting surface 78. In yet another example, the first lower connecting surface 76 is lower than the second lower connecting surface 78.

In a first exemplary embodiment, as shown in FIGS. 6-9, the upper and lower members 64, 66 of the piston 20 are configured such that the first and second upper connecting surfaces 70, 74 are coplanar and the first and second lower connecting surfaces 76, 78 are similarly coplanar. As such, when the upper member 64 is connected to the lower member 66, the resulting joints between the upper and lower member 64, 66 are likewise substantially coplanar. In another exemplary embodiment, as shown in FIG. 10, the first upper connecting surface 70 is positioned a greater vertical distance away from the crown 28 than the second upper connecting surface 74 such that the first and second upper connecting surfaces 70, 74 are non-coplanar. In a like manner, the first lower connecting surface 76 is non-coplanar relative to the second lower connecting surface 78. This non-coplanar position can be referred to as a vertical offset. This vertical offset between the lower connecting surfaces 76, 78 is the same vertical offset between the first and second upper connecting surfaces 70, 74.

Although the embodiment illustrated in FIG. 10 shows that the first upper connecting surface 70 is spaced apart vertically from the crown 28 a greater distance than the second upper connecting surface 74, it should be understood by one of ordinary skill in the art that the first upper connecting surface 70 can also be vertically spaced apart from the crown 28 a smaller distance than the second upper connecting surface 74. The same relative spacing and vertical offsets apply equally to the first and second lower connecting surfaces 76, 78 in a corresponding manner to ensure coincident contact between the upper and lower connecting surfaces during a friction-welding process. It is also to be appreciated that the lower connecting surfaces 76, 78 can be vertically located anywhere along the central axis of the piston 20, and can be located on a ring land, in a compression ring groove 38, or in the oil control ring groove 39. It is also to be noted that the first upper connecting surface 70, and thus the first lower connecting surface 76, are located vertically below a horizontal line tangent to the bottom of the interior wall of the central recess 30, or combustion bowl.

The upper and lower members 64, 66 are formed separately and later joined together to form the complete piston 20. In an embodiment, the upper and lower members 64, 66 are formed using steel, other ferrous material or other high temperature/high strength metals such as titanium, Monel, Inconel, or similar. The material used for the upper and lower members should be of adequate strength and have sufficient heat resistance to impart the needed strength for use in a diesel or other internal combustion engine. The upper and lower members 64, 66 are both precision cast to net final dimensions. Precision cast to net final dimensions specifically means in the embodiments described herein, that both of the final as-cast pieces does not require additional machining to any of the upper connecting surfaces 70, 74 or lower connecting surfaces 76, 78 prior to joining the upper and lower members 64, 66 in a friction or inertial welding process.

Also, by precision casting to net final dimensions, additional machining to form the any of the surfaces of the integral cooling oil reservoir is eliminated. In an embodiment, precision casting to net final dimensions of the upper and lower members 64, 66 means that the precision as-cast dimensional tolerance is between about +/−0.010 inches to about +/−0.020 inches. In another embodiment, precision casting to net final dimensions of the upper and lower members 64, 66 means that the first and second upper connecting surfaces 70, 74 and the first and second lower connecting surfaces 76, 78 have a surface finish roughness of less than about 125 Ra. Although limited post-casting machining may be performed on other surfaces of the upper and lower members 64, 66 for other reasons, the precision cast to net final dimensions of the first and second upper connecting surfaces 70, 74 and the first and second lower connecting surfaces 76, 78 require no post-casting machining whatsoever in order to friction weld the upper and lower members 64, 66 together.

Assembly of the piston 20 includes joining the precision cast to net final dimension upper member 64 to the precision cast to net final dimension lower member 66 by way of friction welding or inertial welding in which the first and second upper connecting surfaces 70, 74 and the first and second lower connecting surfaces 76, 78 are as cast and not in any manner machined prior to the friction welding process. In one example, both the upper and lower members 64, 66 are either rotated such that they continuously rotate in opposing directions about the axial centerline of the piston 20, or one is fixed and the other continuously rotated with respect thereto until the welding process is completed. As one or more of the upper and lower members 64, 66 are continuously rotated, the members are pressed along the longitudinal axis of the piston assembly together such that the first upper connecting surface 70 of the upper member 64 and the first lower connecting surface 76 of the lower member 66 as well as the second upper connecting surface 74 of the upper member 64 and the second lower connecting surface 78 of the lower member 66 contact each other, and additional axial pressure applied to the respective upper and lower members 64, 66 together causes a localized friction weld that integrally and permanently joins the upper member 64 to the lower member 66 without other and/or further manufacturing steps needed to accomplish said joinder For the purposes of this disclosure, the sole source as well as the entirety of the heat necessarily required for the friction welding process is created solely and exclusively by the friction between the two pieces generated by the above axial pressing during the continuous relative rotation between the upper member 64 and the lower member 66.

Upon completion of the friction-welding process, the first upper connecting surface 70 and the first lower connecting surface 76 form a first welded joint 80, and the second upper connecting surface 74 and the second lower connecting surface 78 form a second welded joint 84. As explained above with respect to FIGS. 6-9, in an embodiment, the first welded joint 80 between the first upper and lower connecting surfaces 70, 76 and the second welded joint 84 between the second upper and lower connecting surfaces 74, 78 are substantially coplanar. Also, as explained above with respect to FIG. 10, in another embodiment, the first welded joint 80 between the first upper and lower connecting surfaces 70, 76 and the second welded joint 84 between the second upper and lower connecting surfaces 74, 78 are vertically offset and non-coplanar.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A piston for use in an internal combustion engine, said piston comprising:
   a circular crown located at an upper portion of said piston;
   a combustion surface extending radially inward from the outer circumference of said crown;
   a cylindrical body depending at right angles from the upper surface of said crown, said cylindrical body defines at least one circumferential compression ring groove and at least one oil control ring groove, wherein said cylindrical body comprises a ring land below said at least one oil control ring groove and a portion of said cylindrical body defines at least one multi-arcuate horizontal cross-section on said ring land below said oil control ring groove, wherein said multi-arcuate horizontal cross-section includes arcs including different radii;
   a pair of opposing surfaces, each surface defining a bore formed therethrough,
   wherein said oil control ring groove is configured to correspond with an associated oil control ring and beneath which said multi-arcuate horizontal cross-section is defined by an exterior circumferential surface of said cylindrical body and creates a gap between said cylindrical body and an associated cylinder wall enabling a quantity of oil to pass from an annular region beneath said oil control ring groove between said cylindrical body and the associated cylinder wall to an area adjacent one of said pair of opposing surfaces;
   an upper member, wherein said upper member is precision cast to net final dimensions, and said upper member includes said crown and said combustion surface, said upper member further including a first upper connecting surface and a second upper connecting surface, wherein said first and second upper connecting surfaces are concentrically disposed; and
   a lower member, wherein said lower member is precision cast to net final dimensions, said lower member including said pair of opposing surfaces, and said lower member further including a first lower connecting surface and a second lower connecting surface, wherein said first and second lower connecting surfaces are concentrically disposed;
   wherein said lower member is integrally connected to said upper member by friction welding such that said first upper connecting surface and said first lower connecting surface form a first welded joint therebetween and said second upper connecting surface and said second lower connecting surface form a second welded joint therebetween.

2. The piston of claim 1 further comprising at least one integral cooling oil reservoir formed adjacent to said combustion surface when said upper and lower members are friction welded together.

3. The piston of claim 1, wherein said first upper connecting surface is non-coplanar relative to said second upper connecting surface, and said first lower connecting surface is non-coplanar relative to said second lower connecting surface.

4. The piston of claim 1, wherein said first and second upper connecting surfaces are parallel with respect to said crown.

5. A piston for use in an internal combustion engine, said piston comprising:
   a cylindrical body, said cylindrical body defines at least one compression ring groove and at least one oil control ring groove, wherein said cylindrical body comprises a ring land below said at least one oil control ring groove, and a portion of said cylindrical body defines a multi-arcuate horizontal cross-section on said ring land below said ring groove;
   an upper member, said upper member being precision cast to net final dimensions, said upper member having a combustion surface and at least two concentrically disposed upper connecting surfaces spaced apart from said combustion surface; and
   a lower member, said lower member being precision cast to net final dimensions, said lower member having a pair of bores formed therethrough for receiving a connecting rod pin, and said lower member having at least two concentrically disposed lower connecting surfaces;
   wherein said lower member is attached to said upper member by way of friction welding such that each upper connecting surface of said upper member forms a welded joint with one of said lower connecting surfaces,
   wherein said multi-arcuate horizontal cross-section is defined by an exterior circumferential surface of said cylindrical body and creates a gap between said cylindrical body and an associated cylinder wall enabling a quantity of oil to pass from an annular region between said cylindrical body and the associated cylinder wall to an area adjacent one of said opposing surfaces.

6. The piston of claim 5, wherein all of said at least two upper connecting surfaces are coplanar relative to each other, and all of said at least two concentrically disposed lower connecting surfaces are coplanar relative to each other.

7. The piston of claim 5, wherein at least one of said at least two upper connecting surfaces is non-coplanar relative to the other of said at least two upper connecting surfaces, and at least one of said at least two lower connecting surfaces is non-coplanar relative to the other of said at least two lower connecting surfaces.

8. The piston of claim 5, further comprising at least one integral cooling oil reservoir formed adjacent to said combustion surface when said upper and lower members are friction welded together.

9. The piston of claim 5, further comprising at least one ring groove formed into an outer surface of said upper member and at least one ring groove formed into an outer surface of said lower member.

10. A method of manufacturing a piston comprising:
  precision casting to net final dimensions an upper member, wherein said upper member includes a combustion surface and at least two upper connecting surfaces concentrically disposed and spaced apart from said combustion surface;
  precision casting to net final dimensions a lower member, wherein said lower member includes at least one oil control ring groove and a ring land below said at least one oil control ring groove, a pair of opposing surfaces having a bore formed through each of said surfaces, said lower member also including at least two lower connecting surfaces concentrically disposed, said lower member also defines a multi-arcuate horizontal cross-section on said ring land, said multi-arcuate horizontal cross-section is defined by an exterior circumferential surface of said cylindrical body and creates a gap between said piston and an associated cylinder wall enabling a quantity of oil to pass from an annular region between said piston and the associated cylinder wall to an area adjacent one of said pair of opposing surfaces; and
  friction welding said lower member to said upper member, wherein a welded joint is formed between each of said upper connecting surfaces of said upper member and a corresponding lower connecting surface of said lower member.

\* \* \* \* \*